(12) United States Patent
Kim et al.

(10) Patent No.: US 8,867,461 B2
(45) Date of Patent: Oct. 21, 2014

(54) METHOD OF TRANSMITTING OR RECEIVING UPLINK SIGNALS AND EQUIPMENT THEREFOR

(75) Inventors: Byoung Hoon Kim, Gyeongki-do (KR); Young Seob Choi, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 354 days.

(21) Appl. No.: 13/001,199

(22) PCT Filed: Jun. 26, 2009

(86) PCT No.: PCT/KR2009/003460
§ 371 (c)(1),
(2), (4) Date: Dec. 23, 2010

(87) PCT Pub. No.: WO2010/018927
PCT Pub. Date: Feb. 18, 2010

(65) Prior Publication Data
US 2011/0110323 A1    May 12, 2011

Related U.S. Application Data

(60) Provisional application No. 61/088,000, filed on Aug. 11, 2008.

(30) Foreign Application Priority Data

Dec. 16, 2008    (KR) .......................... 10-2008-0127624

(51) Int. Cl.
*H04W 72/12*    (2009.01)
*H04W 88/02*    (2009.01)
*H04J 11/00*    (2006.01)

(52) U.S. Cl.
USPC .......................................................... 370/329

(58) Field of Classification Search
CPC    H04B 7/2621; H04L 25/0204; H04L 5/0007; H04L 5/003; H04L 5/0069; H04W 72/1268; H04W 72/12; H04W 88/02; H04J 11/00
USPC ........................... 370/254–340; 709/201–213
See application file for complete search history.

(56) References Cited

U.S. PATENT DOCUMENTS 5,995,497 A     11/1999  Gerakoulis
8,422,572 B2 *  4/2013   Forck et al. ................... 375/260

(Continued)

FOREIGN PATENT DOCUMENTS

WO     WO 03/085857        10/2003
WO     2010078062 A1       7/2010

OTHER PUBLICATIONS

NOA dated May 2, 2014, issued by the Korean Intellectual Property Office in Korean Patent Application No. 10-2008-0127624.

*Primary Examiner* — Ayaz Sheikh
*Assistant Examiner* — Debebe Asefa
(74) *Attorney, Agent, or Firm* — Morgan, Lewis & Bockius LLP

(57) ABSTRACT

A method of transmitting or receiving uplink signals in a wireless communication system and an apparatus therefor are provided. In one aspect of the method of transmitting the uplink signals, a base station determines whether each of user equipments uses an orthogonal frequency division multiple access (OFDMA) scheme or a single carrier-frequency division multiple access (SC-FDMA) scheme in uplink transmission. Further, the base station transmits scheduling information containing information regarding the determined multiple access scheme to the user equipments, and thus reports a multiplexing scheme to be used by each user equipment. In addition, each user equipment transmits the uplink data to the base station by multiplexing the uplink data by using the OFDMA scheme or the SC-FDMA scheme according to the scheduling information.

1 Claim, 7 Drawing Sheets

(56) References Cited

U.S. PATENT DOCUMENTS

| | | |
|---|---|---|
| 2003/0190897 A1 | 10/2003 | Lei et al. |
| 2006/0111129 A1* | 5/2006 | Ihm et al. ................ 455/466 |
| 2006/0205356 A1 | 9/2006 | Laroia et al. |
| 2006/0268676 A1* | 11/2006 | Gore et al. ................ 370/210 |
| 2007/0036179 A1* | 2/2007 | Palanki et al. ............ 370/491 |
| 2010/0091919 A1* | 4/2010 | Xu et al. .................. 375/346 |
| 2010/0167653 A1 | 7/2010 | Kim et al. |
| 2010/0272055 A1* | 10/2010 | Noh et al. ................. 370/329 |
| 2010/0317382 A1* | 12/2010 | Lee et al. .................. 455/501 |
| 2013/0343329 A1* | 12/2013 | Papasakellariou et al. ... 370/329 |

* cited by examiner ured. The D/A converter converts serial data symbols into parallel data symbols. The frequency region mapper allocates the converted parallel data symbols to subcarriers having orthogonality. The IFFT processor converts the parallel data symbol, which has been converted in the frequency region, into a time region signal. The CP inserter inserts a CP to data output from the IFFT processor. The RF transmitter transmits the CP-inserted data.

METHOD OF TRANSMITTING OR RECEIVING UPLINK SIGNALS AND EQUIPMENT THEREFOR

The present application is a national stage of PCT International Application No. PCT/KR2009/003460, filed Jun. 29, 2009, and claims the benefit of US Provisional Application No. 61/088,000, filed Aug. 11, 2008. The present national stage application also claims the benefit of Korean Patent Application No. 10-2008-0127624, filed Dec. 16, 2008.

TECHNICAL FIELD

The present invention relates to wireless communications, and more particularly, to a method of transmitting or receiving uplink signals in a wireless communication system and an apparatus therefor.

BACKGROUND ART

3rd generation partnership project (3GPP) mobile communication systems based on a wideband code division multiple access (WCDMA) radio access technology are widely spread all over the world. High-speed downlink packet access (HSDPA) that can be defined as a first evolutionary stage of WCDMA provides 3GPP with a radio access technique that is highly competitive in the mid-term future. However, since requirements and expectations of users and service providers are continuously increased and developments of competing radio access techniques are continuously in progress, new technical evolutions in 3GPP are required to secure competitiveness in the future.

An orthogonal frequency division multiplexing (OFDM) system capable of reducing inter-symbol interference with a low complexity is taken into consideration as one of next generation (after the 3rd generation) systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased. Therefore, inter-symbol interference is minimized.

In a system using the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. The OFDMA is adopted for uplink and downlink transmission in institute of electrical and electronics engineers (IEEE) 802.16 and 3rd generation partnership project 2 (3GPP2) ultra mobile broadband (UMB) and for downlink transmission in 3GPP long term evolution (LTE).

FIG. 1 is a block diagram showing a structure of a typical OFDMA transmitter. Referring to FIG. 1, the OFDMA transmitter includes an encoder, a modulator, a digital/analog (D/A) converter, a frequency region mapper, an inverse fast Fourier transform (IFFT) processor, an analog/digital (A/D) converter, a cyclic prefix (CP) inserter, and a radio frequency (RF) transmitter. In the OFDMA transmitter, the encoder first encodes data to be transmitted. Then, the modulator receives the encoded data and converts the received into a serial symbol in a frequency region. The D/A converter converts serial data symbols into parallel data symbols. The frequency region mapper allocates the converted parallel data symbols to subcarriers having orthogonality. The IFFT processor converts the parallel data symbol, which has been converted in the frequency region, into a time region signal. The CP inserter inserts a CP to data output from the IFFT processor. The RF transmitter transmits the CP-inserted data.

One of main problems of the OFDMA system is that power efficiency of signals can be low due to a significantly large peak-to-average power ratio (PAPR). The PAPR problem occurs when a peak amplitude of a transmit (Tx) signal is significantly larger than an average amplitude. Further, the PAPR problem is caused by a fact that an OFDM symbol is an overlap of N sinusoidal signals on different subcarriers. A high PAPR is not a significant problem in a base station (BS) in which power is not limited relatively. However, the high PAPR is problematic in a user equipment (UE) which has limited maximum power and of which a power amplifier is limited in efficiency. Therefore, not to mention that the OFDMA is adopted as a multiplexing scheme for downlink, when the OFDMA is adopted as a multiplexing scheme for uplink, power consumption of the UE increases, resulting in decrease in the coverage of the BS.

Single carrier-frequency division multiple access (SC-FDMA) is proposed to decrease the PAPR. The SC-FDMA is single carrier-frequency division equalization (SC-FDE) combined with frequency division multiple access (FDMA). The SC-FDMA is similar to the OFDMA in that data is modulated and demodulated in a time region and a frequency region by using discrete Fourier transform (DFT). However, the SC-FDMA is advantageous to decrease Tx power since a Tx signal has a low PAPR. In particular, regarding battery usage, the SC-FDMA is advantageous in case of uplink transmission where communication is achieved from a UE sensitive to Tx power to the BS. Due to these advantages, the SC-FDMA is adopted as a multiplexing scheme for uplink in the 3GPP LTE, i.e., a 4th generation mobile communication technique.

FIG. 2 is a block diagram showing a structure of a typical SC-FDMA transmitter. Referring to FIG. 2, the SC-FDMA transmitter includes an encoder, a modulator, a D/A converter, a discrete Fourier transform (DFT) processor, a frequency region mapper, an IFFT processor, an A/D converter, a CP inserter, and an RF transmitter.

The structure of the SC-FDMA transmitter is very similar to that of the OFDMA transmitter except that the SC-FDMA transmitter further includes the DFT processor and except that the modulator and D/A converter process time region data whereas the OFDMA transmitter processes frequency region data. More specifically, in the SC-FDMA transmitter, the encoder first encodes data to be transmitted. Then, the modulator receives the encoded data and converts the received into a serial symbol in a time region. The D/A converter converts a time region serial data symbol into a parallel symbol. An output of the D/A converter is input to the DFT processor, is converted into a frequency region signal, and is then input to the frequency region mapper. The frequency region mapper allocates the converted parallel data symbol to a subcarrier. The IFFT processor converts the parallel data symbol, which has been converted in the frequency region, into a time region signal. The CP inserter inserts a CP to data output from the IFFT processor. The RF transmitter transmits the CP-inserted data.

As such, the SC-FDMA transmitter processes data in the time region and arranges data also in the time region when transmission is performed. Therefore, the PAPR is decreased and thus efficiency of a power amplifier can be increased. Accordingly, it is effective to use the SC-FDMA transmitter when the UE is sensitive to power consumption. In particular, the use of the SC-FDMA transmitter is effective for UEs located in a cell boundary. However, the SC-FDMA has a disadvantage in that transmission efficiency in a multi-path fading channel is generally low in comparison with the OFDMA. In addition, the SC-FDMA has another disadvantage in that high transmission efficiency is difficult to be achieved since its performance is poor in a high-order modulation scheme such as quadrature amplitude modulation (QAM) in comparison with the OFDMA and since it is unfavorable to use a maximum likelihood (ML) multiple input multiple output (MIMO) detector or a low complex transform receiver in a multiple antenna system (i.e., MIMO system).

DISCLOSURE OF INVENTION

Technical Problem

As such, although an OFDMA scheme can achieve high transmission efficiency in a multipath fading channel, a large amount of power consumption may occur occasionally since a Tx signal has a high PAPR. On the other hand, an SC-FDMA scheme is effective to reduce power consumption due to a relatively low PAPR, but has a disadvantage in that transmission efficiency is not high in the multipath fading channel. In the conventional wireless communication system, only one of the OFDMA scheme and the SC-FDMA scheme is employed as a multiplexing scheme for uplink transmission (e.g., the OFDMA scheme is employed in IEEE 802.16 or 3GPP2 UMB, and the SC-FDMA scheme is employed in 3GPP LTE). In this case, it is difficult to achieve high transmission efficiency in the entire cell due to a disadvantage of each multiplexing scheme.

Accordingly, the present invention provides a scheduling method for uplink transmission, whereby high transmission efficiency can be achieved in the entire cell, a method of transmitting or receiving uplink signals, and an apparatus therefor.

Technical Solution

According to an aspect of the present invention, a method of transmitting uplink data in a wireless communication system is provided. The method includes determining, by a base station, whether each of user equipments uses an orthogonal frequency division multiple access (OFDMA) scheme or a single carrier-frequency division multiple access (SC-FDMA) scheme in uplink transmission, transmitting, by the base station, scheduling information containing information regarding the determined multiple access scheme to the user equipments, and transmitting, by each of the user equipments, the uplink data to the base station by multiplexing the uplink data by using the OFDMA scheme or the SC-FDMA scheme according to the scheduling information.

In the aforementioned aspect of the present invention, in the determining, at least one user equipment using the OFDMA scheme and at least one user equipment using the SC-FDMA scheme may be determined. Alternatively, in the determining, a multiplexing scheme to be used may be determined by considering at least one of a channel state and a distance between the base station and each user equipment. In this case, a user equipment located near the base station may use the OFDMA scheme, and a user equipment located in a cell boundary and separated far from the base station may use the SC-FDMA scheme. Alternatively, in the determining, among the user equipments, if one or more user equipments have a plurality of antennas, a multiplexing scheme to be used for each antenna may be determined for the user equipments having the plurality of antennas.

According to another aspect of the present invention, a method of transmitting uplink data in a wireless communication system is provided. The method includes, for a user equipment having a plurality of antennas, determining by a base station a first antenna and a second antenna, wherein the user equipment uses an OFDMA scheme for the first antenna and uses an SC-FDMA scheme for the second antenna in uplink transmission, transmitting, by the base station, scheduling information containing information regarding a multiple access scheme, determined for the plurality of antennas and to be used for each antenna, to the user equipment, and transmitting, by the user equipment, a signal multiplexed using the OFDMA scheme through the first antenna and a signal multiplexed using the SC-FDMA scheme through the second antenna according to the scheduling information.

According to another aspect of the present invention, a wireless apparatus is provided. The wireless apparatus includes a plurality of antennas, and a transmitter generating a signal to be transmitted using the plurality of antennas, wherein the transmitter comprises an OFDMA transmission unit generating an OFDMA signal and an SC-FDMA transmission unit generating an SC-FDMA signal, and according to scheduling information received from a base station, one or more antennas are used among the plurality of antennas to transmit the OFDMA signal generated by the OFDMA transmission unit and the remaining antennas among the plurality of antennas are used to transmit the SC-FDMA signal generated by the SC-FDMA transmission unit.

According to another aspect of the present invention, a receiver for restoring data by processing a signal received through one or more antennas is provided. The receiver includes a fast Fourier transform (FFT) processor performing an FFT operation on the received signal to convert the signal into a frequency region signal, a demultiplexer (DEMUX) separating an OFDMA signal and an SC-FDMA signal from a signal output from the FFT processor, a channel/interference estimator performing a channel/interference estimation operation on the OFDMA signal and the SC-FDMA signal output from the DEMUX, an OFDMA signal processing unit restoring first data by processing the OFDMA signal output from the channel/interference estimator, and an SC-FDMA signal processing unit restoring second data by processing the SC-FDMA signal output from the channel/interference estimator.

According to another aspect of the present invention, a method of processing a signal received through one or more antennas is provided. The method includes performing an FFT operation on the received signal to convert the signal into a frequency region signal, performing a DEMUX operation to separate the frequency region signal into an OFDMA signal and an SC-FDMA signal, performing a channel/interference estimation operation on the OFDMA signal and the SC-FDMA signal output as a result of the DEMUX operation, performing an OFDMA signal processing operation to restore first data by processing the OFDMA signal output as a result of the channel/interference estimation operation, and performing an SC-FDMA signal processing operation to restore second data by processing the SC-FDMA signal output as a result of the channel/interference estimation operation.

Advantageous Effects

According to an exemplary embodiment of the present invention, in a wireless communication system, a wireless apparatus (i.e., user equipment) can transmit uplink signals by using either an orthogonal frequency division multiple access (OFDMA) scheme or a single carrier-frequency division multiple access (SC-FDMA) scheme as a multiplexing scheme. Thus, the user equipment or the like can use an optimal multiplexing scheme according to a channel state, a distance to a base station, etc., thereby maximizing transmission efficiency. In particular, when the user equipment is located in a cell boundary, the user equipment is allowed to transmit a signal multiplexed using the SC-FDMA scheme. Therefore, waste of power of the user equipment can be reduced.

MODE FOR THE INVENTION

Hereinafter, exemplary embodiments of the present invention will be described in detail with reference to the accompanying drawings.

Figure 1:
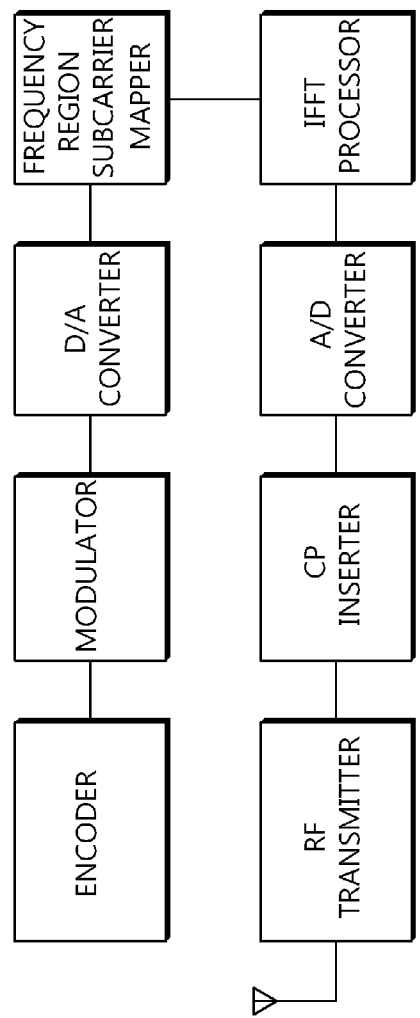
FIG. 1 is a block diagram showing a structure of a typical orthogonal frequency division multiple access (OFDMA) transmitter.
Figure 2:
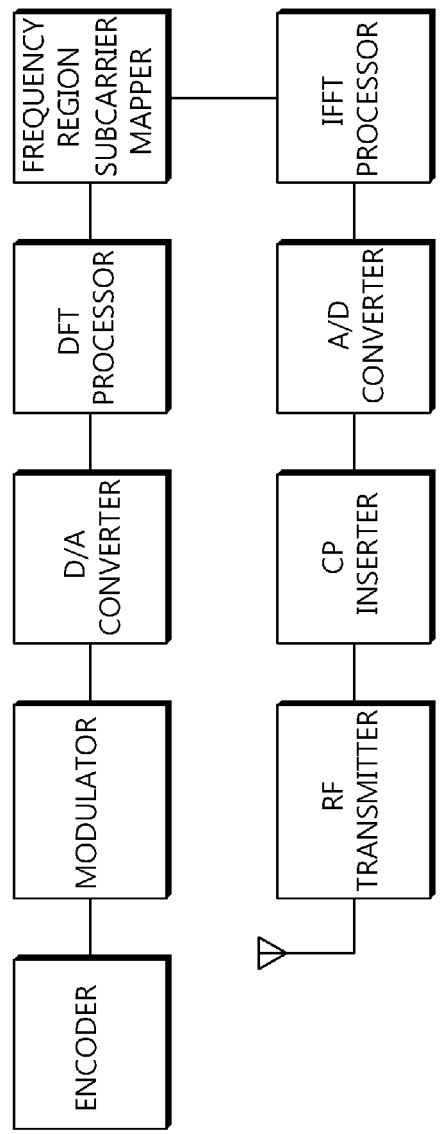
FIG. 2 is a block diagram showing a structure of a typical single carrier-frequency division multiple access (SC-FDMA) transmitter.
Figure 3:
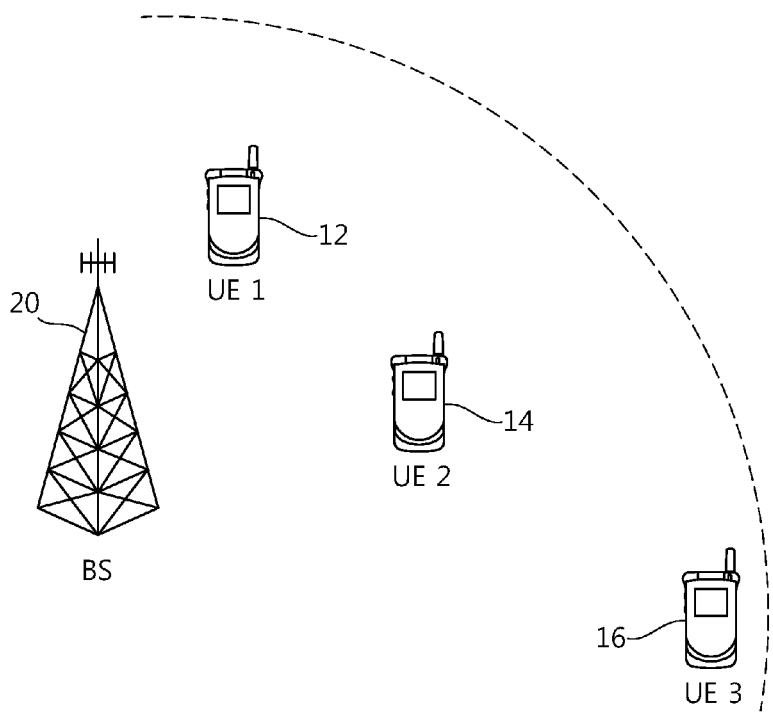
FIG. 3 is a diagram showing a structure of a wireless communication system according to an embodiment of the present invention.

FIG. 3 is a diagram showing a structure of a wireless communication system according to an embodiment of the present invention. The wireless communication system can be widely deployed to provide a variety of communication services, such as voices, packet data, etc.

Referring to FIG. 3, the wireless communication system includes a plurality of user equipments (UEs) 12, 14, and 16 and a base station (BS) 20. The UEs 12, 14, and 16 may be fixed or mobile, and may be referred to as another terminology, such as a mobile station (MS), a user terminal (UT), a subscriber station (SS), a wireless device, etc. The BS 20 is generally a fixed station that communicates with the UEs 12, 14, and 16 and may be referred to as another terminology, such as a node-B, a base transceiver system (BTS), an access point, etc. There are one or more cells within the coverage of the BS 20. Within the cell, an uplink denotes a communication link from the UEs 12, 14, and 16 to BS 20. In the uplink, a transmitter may be a part of the UEs 12, 14, and 16, and a receiver may be a part of the BS 20.

According to an embodiment of the present invention, the BS schedules a multiplexing scheme for uplink transmission so that each UE within the cell can use either an orthogonal frequency division multiple access (OFDMA) scheme or a single carrier-frequency division multiple access (SC-FDMA) scheme as the multiplexing scheme for uplink transmission. In this case, the BS does not have to schedule the multiplexing scheme so that the OFDMA scheme and the SC-FDMA scheme are distinctively used on a frequency-time resource. Thus, the BS may schedule the multiplexing scheme so that the OFDMA scheme and the SC-FDMA scheme can be used together on the same frequency-time resource. The BS schedules the multiplexing scheme to be used by each UE so that high transmission efficiency can be achieved by considering a location or channel state of each UE and so that power consumption of each UE is minimized.

For example, in the wireless communication system of FIG. 3, the BS 20 may schedule the multiplexing scheme so that the UE 16 located in a cell boundary uses the SC-FDMA in uplink transmission and so that the UE 12 located near the BS 20 uses the OFDMA scheme in uplink transmission. Further, the BS may schedule the multiplexing scheme so that the remaining UEs (e.g., UE 14) use either the SC-FDMA scheme or the OFDMA scheme to achieve high transmission efficiency by considering the channel state or the multiplexing scheme used by other UEs 12 and 16.

Figure 4:
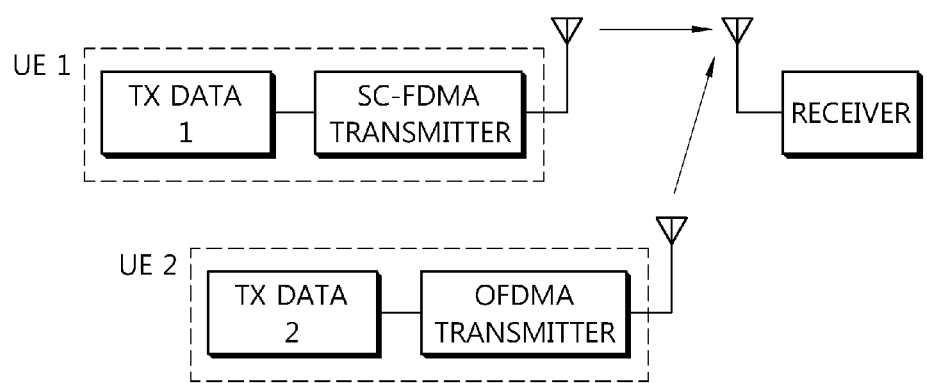
FIG. 4 shows an example where two user equipments (UEs) simultaneously transmit uplink signals by using different multiple access schemes according to an embodiment of the present invention.

FIG. 4 shows an example where two UEs simultaneously transmit uplink signals by using different multiple access schemes according to an embodiment of the present invention. Referring to FIG. 4, a first UE processes transmit (Tx) data 1 by using an SC-FDMA transmitter and transmits the processed Tx data 1 to a receiver, and a second UE processes Tx data 2 by using an OFDMA transmitter and transmits the processed Tx data 2 to the receiver. The receiver may be a part of a BS, or may be a part of a relay station (RS) according to a type of the wireless communication system. As shown in the example of FIG. 4, the BS may select a UE (i.e., the first UE) that uses the SC-FDMA in uplink and a UE (i.e., the second UE) that uses the OFDMA in uplink, and may perform scheduling so that the two UEs simultaneously perform transmission.

Figure 5:
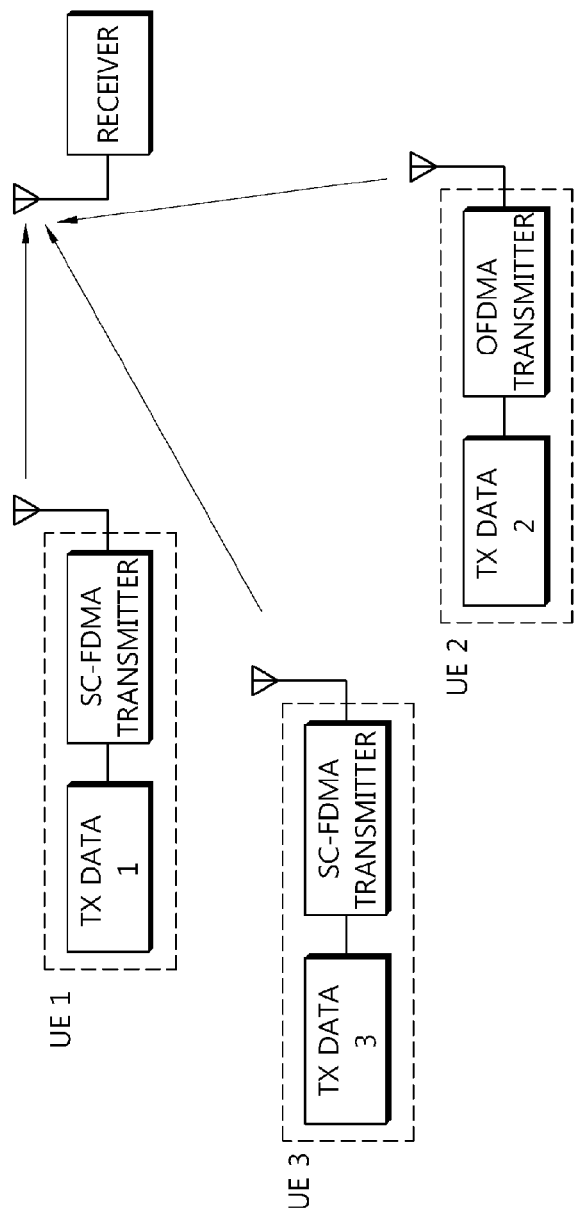
FIG. 5 shows an example where three UEs simultaneously transmit uplink signals by using different multiple access schemes.

FIG. 5 shows an example where three UEs simultaneously transmit uplink signals by using different multiple access schemes. In the example of FIG. 5, one UE transmits an OFDMA signal, and the remaining two UEs transmit SC-FDMA signals. Referring to FIG. 5, a first UE processes Tx data 1 by using an SC-FDMA transmitter and then transmits the processed Tx data 1 to a receiver, a second UE processes Tx data 2 by using an OFDMA transmitter and then transmits the processed Tx data 2 to the receiver, and a third UE processes Tx data 3 by using an SC-FDMA transmitter and then transmits the processed Tx data 3 to the receiver. As shown in the example of FIG. 5, the BS may select UEs (i.e., the first UE and the third UE) that use the SC-FDMA in uplink and a UE (i.e., the second UE) that uses the OFDMA in uplink, and may perform scheduling so that the three UEs simultaneously perform transmission.

The examples of FIG. 4 and FIG. 5 are for exemplary purposes only, and thus the embodiment of the present invention is not limited thereto. The embodiment of the present invention can apply irrespective of the number of UEs located within a cell and the number of antennas of each UE. Further, the embodiment of the present invention may be implemented in any form as long as some of all UEs use the OFDMA scheme and the remaining UEs use the SC-FDMA scheme. Optionally, all UEs may use the same multiplexing scheme. For example, two UEs each having one antenna may perform transmission by using the SC-FDMA scheme, a UE having two antennas may perform transmission by using the OFDMA scheme, and a BS having four antennas may detect all signals.

According to another embodiment of the present invention, a UE having a plurality of antennas may schedule a multiplexing scheme for each antenna between the OFDMA and the SC-FDMA. In a multi user MIMO (MU-MIMO) or single user MIMO (SU-MIMO) environment, the BS may perform scheduling so that an OFDMA signal and an SC-FDMA signal are simultaneously transmitted in uplink if that is required to achieve optimal performance in consideration of channel states of UEs.

Figure 6:
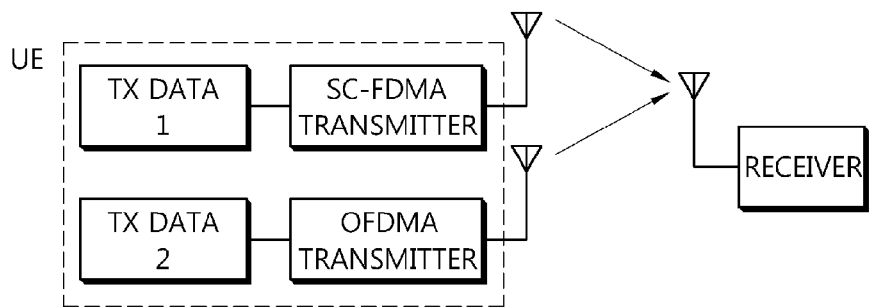
FIG. 6 shows an example where one UE transmits both an OFDMA signal and an SC-FDMA signal according to an embodiment of the present invention.

FIG. 6 shows an example where one UE transmits both an OFDMA signal and an SC-FDMA signal according to an embodiment of the present invention. Referring to FIG. 6, the UE transmits Tx data 1 by processing it using an SC-FDMA transmitter, and transmits Tx data 2 by processing it using an OFDMA transmitter. In the SU-MIMO environment, if that is required to achieve optimal performance in consideration of a channel state or the like, the BS may schedule uplink transmission so that the UE selects one or more antennas using the OFDMA scheme and selects one or more antennas using the SC-FDMA scheme and so that transmission is performed simultaneously through the two or more antennas.

For example, if a first antenna experiences a multi-path channel and a second antenna experiences a single-path (or its equivalent) channel, the first antenna may transmit an OFDMA signal to increase transmission efficiency of a frequency selective fading channel, and the second antenna may transmit an SC-FDMA signal to increase an output of a power amplifier (PA). The embodiment of the present invention can apply irrespective of the number of antennas. For example, if the UE has three antennas, the BS can schedule uplink transmission of the UE so that first and second antennas transmit OFDMA signals and a third antenna transmits an SC-FDMA signal.

By the scheduling method of uplink transmission according to the embodiment of the present invention, uplink signals multiplexed using different multiplexing schemes at the same time are transmitted through the same frequency band. Therefore, a receiver (e.g., BS) which receives the uplink signals has to be able to perform decoding by separating the uplink signals multiplexed using different multiplexing schemes. For example, to decode a received signal, the BS may use a typical linear receiver (e.g., linear minimum mean square error (LMMSE)) or may use an advanced receiver equipped with a successive interference cancellation (SIC) unit or the like to improve performance. Hereinafter, such an advanced receiver will be referred to as an 'SIC receiver'. In case of using the SIC receiver, SIC decoding of the received signal may be first performed either in a time region or a frequency region.

In the SU-MIMO environment described with reference to FIG. 6, if a first antenna of the UE (i.e., transmitter) transmits an SC-FDMA signal and a second antenna transmits an OFDMA signal, the receiver may cancel signal interference of the first antenna and thereafter allow a signal of the second antenna to have a signal to interference plus noise ratio (SINR) of identical or similar frequency region subcarriers, thereby optimizing detection performance of the OFDMA signal. For another example, if the receiver can estimate individual interference or a plurality of grouped interferences on each signal symbol by using an advanced interference signal estimator or the like, channel capacity can be maximized according to information theory (i.e., Jensen's inequality) by allowing an SC-FDMA signal having a high PAPR in a frequency region to act as an interference signal for detecting an OFDMA signal and by allowing an OFDMA signal having a high PAPR in a time region to act as an interference signal for detecting an SC-FDMA signal. In this case, whether the channel capacity can be achieved is determined according to performance of the advanced interference estimator.

Figure 7:
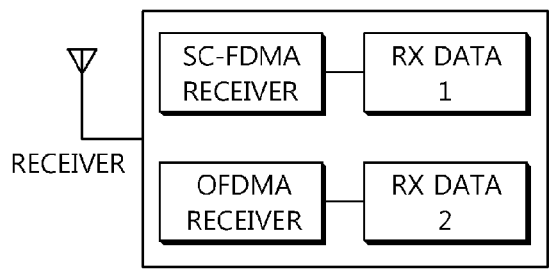
FIG. 7 is a block diagram showing a structure of a receiver according to an embodiment of the present invention.

FIG. 7 is a block diagram showing a structure of a receiver according to an embodiment of the present invention. Referring to FIG. 7, the receiver includes two types of signal processing units, i.e., an SC-FDMA signal processing unit and an OFDMA signal processing unit. The SC-FDMA signal processing unit serves to process receive (Rx) data 1 transmitted from a transmitter by using the SC-FDMA scheme. The OFDMA signal processing unit serves to process Rx data 2 transmitted from the transmitter by using the OFDMA scheme. A method using the two types of signal processing units may be various according to performance of each signaling processing unit. For example, each signal processing unit may use a typical linear receiver or may use a SIC or maximum likelihood (ML) receiver or other advanced receivers.

Figure 8:
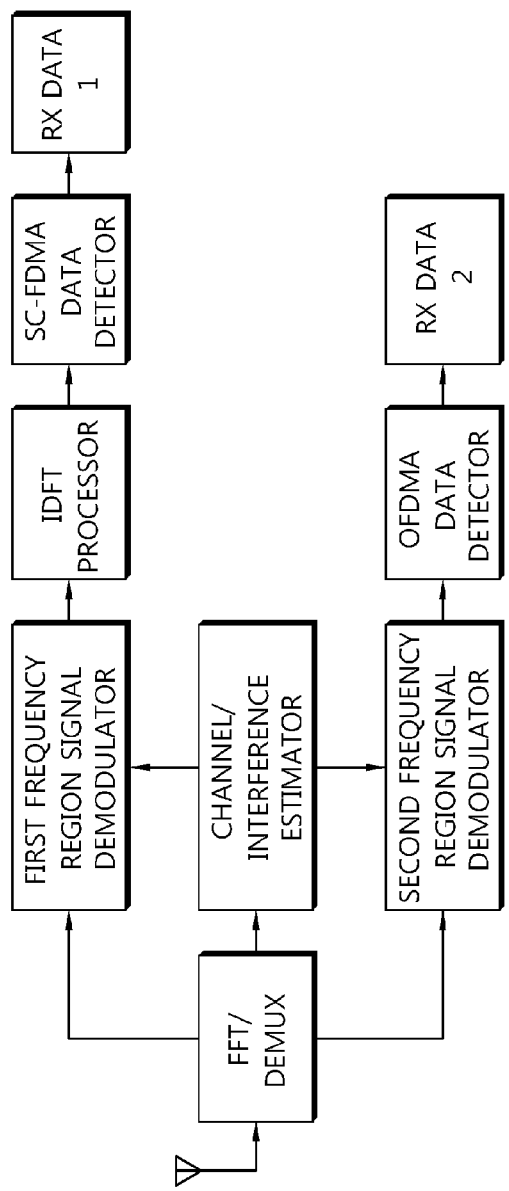
FIG. 8 is a block diagram showing a receiver of FIG. 7 according to a first embodiment of the present invention.

FIG. 8 is a block diagram showing the receiver of FIG. 7 according to a first embodiment of the present invention. The first embodiment is an example of an apparatus for decoding each of an SC-FDMA signal and an OFDMA signal among received signals. Referring to FIG. 8, the receiver includes a fast Fourier transform (FFT)/demultiplexer (DEMUX) unit, a channel/interference estimator, an SC-FDMA signal processing unit, and an OFDMA signal processing unit. The SC-FDMA signal processing unit includes a first frequency region signal demodulator, an inverse discrete Fourier transform (IDFT) processor, and an SC-FDMA data detector. The OFDMA signal processing unit includes a second frequency region signal demodulator and an OFDMA data detector.

Referring to FIG. 8, the FFT unit of the receiver performs an FFT operation on a received time region signal and thus converts the signal into a frequency region signal. The DEMUX unit divides the converted frequency region signal into an SC-FDMA signal and an OFDMA signal. The divided signals are input to the channel/interference estimator. The SC-FDMA signal output from the channel/interference estimator is subjected to a channel equalization process through the first frequency region signal demodulator, is converted into a time region signal by the IDFT processor, and thereafter is decoded in a time region by the use of the SC-FDMA data detector (Rx data 1). Independently from the SC-FDMA signal, the OFDMA signal is decoded by the second frequency region signal demodulator and the OFDMA data detector (Rx data 2).

Figure 9:
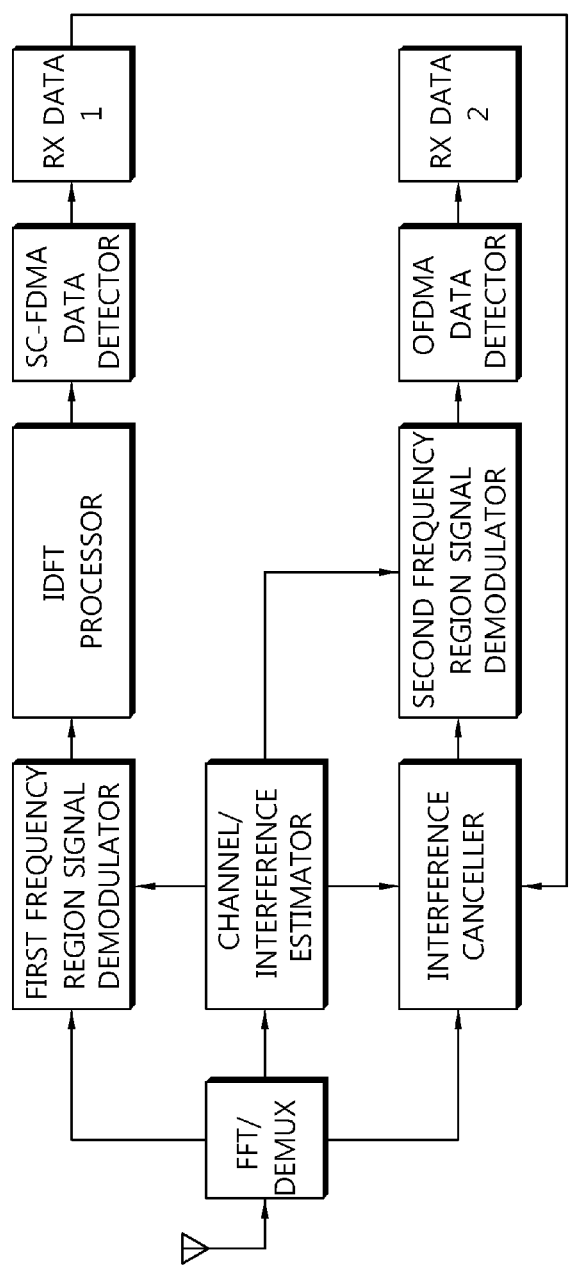
FIG. 9 is a block diagram showing a receiver of FIG. 7 according to a second embodiment of the present invention.

FIG. 9 is a block diagram showing the receiver of FIG. 7 according to a second embodiment of the present invention. The second embodiment is an example of an apparatus for detecting an SC-FDMA signal first and then detecting an OFDMA signal. Referring to FIG. 9, the receiver includes an FFT/DEMUX unit, a channel/interference estimator, an SC-FDMA signal processing unit, and an OFDMA signal processing unit. The SC-FDMA signal processing unit includes a first frequency region signal demodulator, an IDFT processor, and an SC-FDMA data detector. The OFDMA signal processing unit includes an interference canceller, a second frequency region signal demodulator, and an OFDMA data detector.

Referring to FIG. 9, the FFT unit of the receiver performs an FFT operation on a received time region signal and thus converts the signal into a frequency region signal. The DEMUX unit divides the converted frequency region signal into an SC-FDMA signal and an OFDMA signal. The divided signals are input to the channel/interference estimator. The SC-FDMA signal output from the channel/interference estimator is subjected to a channel equalization process through the first frequency region signal demodulator, is converted into a time region signal by the IDFT processor, and thereafter is decoded in a time region by the use of the SC-FDMA data detector (Rx data 1). Regarding the OFDMA signal output from the channel/interference estimator, interference caused by an SC-FDMA signal is cancelled by using the decoded Rx data 1 (by the interference canceller). Then, the OFDMA signal is decoded by the second frequency region signal demodulator and the OFDMA data detector (Rx data 2).

Figure 10:
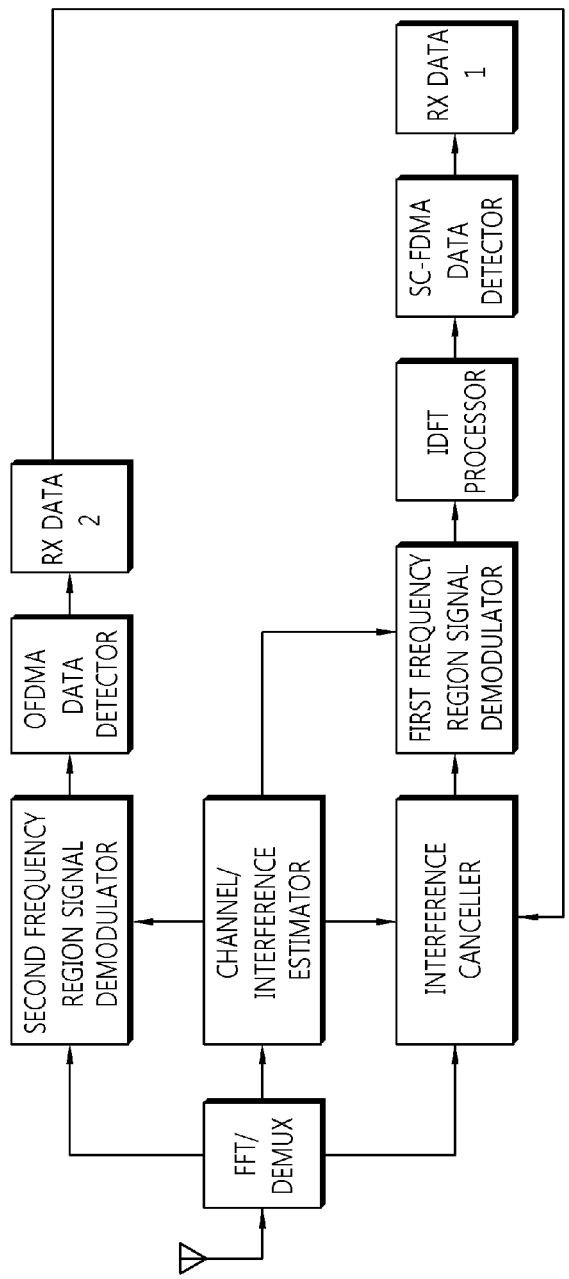
FIG. 10 is a block diagram showing a receiver of FIG. 7 according to a third embodiment of the present invention.

FIG. 10 is a block diagram showing the receiver of FIG. 7 according to a third embodiment of the present invention. The third embodiment is an example of an apparatus for detecting an OFDMA signal first and then detecting an SC-FDMA signal. Referring to FIG. 10, the receiver includes an FFT/DEMUX unit, a channel/interference estimator, an OFDMA signal processing unit, and an SC-FDMA signal processing unit. The OFDMA signal processing unit includes a second frequency region signal demodulator and an OFDMA data detector. The SC-FDMA signal processing unit includes an interference canceller, a first frequency region signal demodulator, an IDFT processor, and an SC-FDMA data detector.

Referring to FIG. 10, the FFT unit of the receiver performs an FFT operation on a received time region signal and thus converts the signal into a frequency region signal. The DEMUX unit divides the converted frequency region signal into an SC-FDMA signal and an OFDMA signal. The divided signals are input to the channel/interference estimator. The OFDMA signal output from the channel/interference estimator is subjected to a channel equalization process through the second frequency region signal demodulator, and is then decoded by the use of the OFDMA data detector (Rx data 2). Regarding the SC-FDMA signal output from the channel/interference estimator, interference caused by an OFDMA signal is cancelled by using the decoded Rx data 2 (by interference canceller). Then, the SC-FDMA signal is decoded by the first frequency region signal demodulator, the IDFT processor, and the SC-FDMA data detector (Rx data 1).

The structure and operation of the receiver according to the embodiment of the present invention described with reference to FIG. 8 to FIG. 10 are for exemplary purposes only, and thus may be implemented in other ways such as using a method of performing SIC. For example, the receiver according to the embodiment of the present invention may alternately detect an OFDMA signal and an SC-FDMA signal, performs the SIC, and then sequentially detect the signals. For another example, if one UE having two antennas transmits an OFDMA signal and two UEs each having one antenna transmit SC-FDMA signals, the OFDMA signal is first detected and is removed from the received signal, and the two SC-FDMA signals are sequentially detected. Alternatively, in the above example, the SC-FDMA signals are sequentially detected and are removed from the received signal, and then the OFDMA signal is detected.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A base station in a wireless communication system, comprising:
    a scheduler configured to assign uplink transmission scheme to a user equipment (UE) based on channel state of the UE, a distance between the UE and the base station, and the number of UEs assigned the uplink transmission scheme in a cell, the uplink transmission scheme for the UE being one of: an orthogonal frequency division multiple access (OFDMA) scheme and a single carrier-frequency division multiple access (SC-FDMA) scheme;
    a receiver configured to process a signal received from the user equipment;
    a fast Fourier transform (FFT) processor configured to perform an FFT operation on the received signal to convert the signal into a frequency region signal;
    a demultiplexer (DEMUX) configured to separate an orthogonal frequency division multiple access (OFDMA) signal and a single carrier-frequency division multiple access (SC-FDMA) signal from a signal output from the FFT processor;
    a channel/interference estimator configured to perform a channel/interference estimation operation on the OFDMA signal and the SC-FDMA signal output from the DEMUX;
    an OFDMA signal processing unit configured to restore first data by processing the OFDMA signal output from the channel/interference estimator; and
    an SC-FDMA signal processing unit configured to restore second data by processing the SC-FDMA signal output from the channel/interference estimator,
    wherein the SC-FDMA signal processing unit comprises a first interference canceller configured to cancel interference of the SC-FDMA signal output from the channel/interference estimator by using the first data output from the OFDMA signal processing unit, and
    wherein the OFDMA signal processing unit comprises a second interference canceller configured to cancel interference of the OFDMA signal output from the channel/interference estimator by using the second data output from the SC-FDMA signal processing unit.

* * * * *